US009647791B2

(12) United States Patent
Gao et al.

(10) Patent No.: US 9,647,791 B2
(45) Date of Patent: May 9, 2017

(54) WAVELENGTH CONFIGURATION METHOD AND APPARATUS FOR MULTI-WAVELENGTH PASSIVE OPTICAL NETWORK, AND MULTI-WAVELENGTH PASSIVE OPTICAL NETWORK SYSTEM

(71) Applicant: Huawei Technologies Co., Ltd., Shenzhen (CN)

(72) Inventors: Bo Gao, Wuhan (CN); Huafeng Lin, Shenzhen (CN); Jianhe Gao, Wuhan (CN); Fei Ye, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 14/569,682

(22) Filed: Dec. 13, 2014

(65) Prior Publication Data

US 2015/0098704 A1     Apr. 9, 2015

Related U.S. Application Data

(63) Continuation of application No. PCT/CN2012/076848, filed on Jun. 13, 2012.

(51) Int. Cl.
*H04J 14/00* (2006.01)
*H04B 10/20* (2006.01)
(Continued)

(52) U.S. Cl.
CPC ........ *H04J 14/0232* (2013.01); *H04J 14/025* (2013.01); *H04J 14/0246* (2013.01);
(Continued)

(58) Field of Classification Search
CPC  H04J 14/025; H04J 14/0282; H04B 10/0773; H04B 2210/072; H04B 10/08; H04B 10/272
(Continued)

(56) References Cited

U.S. PATENT DOCUMENTS 5,838,913 A    11/1998  Lysejko et al.
6,304,350 B1   10/2001  Doerr et al.
(Continued)

FOREIGN PATENT DOCUMENTS

CN    101222279 A    7/2008
CN    101521837 A    9/2009
(Continued)

*Primary Examiner* — David Payne
*Assistant Examiner* — Pranesh Barua
(74) *Attorney, Agent, or Firm* — Leydig, Voit & Mayer, Ltd.

(57) ABSTRACT

The present application provides a wavelength configuration method for a multi-wavelength passive optical network, which includes: scanning, by an ONU, a downstream receiving wavelength, and receiving, downstream wavelength information of each downstream wavelength channel that is broadcast by an OLT separately through each downstream wavelength channel of a multi-wavelength PON system; establishing, by the ONU, a downstream receiving wavelength mapping table, where an entry of the downstream receiving wavelength mapping table includes downstream receiving wavelength information, drive current information of a downstream optical receiver and receiving optical physical parameter information of the ONU; selecting, by the ONU, one downstream wavelength from the downstream wavelength information broadcast by the OLT, and setting, according to the drive current information of the downstream optical receiver recorded in a related entry of the downstream receiving wavelength mapping table, an operating wavelength of the downstream optical receiver to the selected downstream wavelength.

18 Claims, 5 Drawing Sheets

(51) Int. Cl.
*H04J 14/02* (2006.01)
*H04B 10/08* (2006.01)
*H04B 17/00* (2015.01)

(52) U.S. Cl.
CPC ...... *H04J 14/0247* (2013.01); *H04J 14/0252* (2013.01); *H04J 14/0257* (2013.01); *H04J 14/0258* (2013.01); *H04J 14/0267* (2013.01); *H04J 14/0269* (2013.01); *H04J 14/0275* (2013.01); *H04J 14/0282* (2013.01)

(58) Field of Classification Search
USPC .......................... 398/68, 91, 63, 27, 79, 10
See application file for complete search history.

(56) References Cited

U.S. PATENT DOCUMENTS

| | | | |
|---|---|---|---|
| 8,041,217 B2 | 10/2011 | Bouda | |
| 8,532,482 B2* | 9/2013 | Yang | H04B 10/0791 398/10 |
| 2005/0243837 A1* | 11/2005 | Boyd | H04L 45/00 370/395.52 |
| 2007/0092256 A1 | 4/2007 | Nozue et al. | |
| 2007/0183779 A1* | 8/2007 | Bouda | H04J 14/0226 398/72 |
| 2007/0274722 A1* | 11/2007 | Zhao | H04L 41/0853 398/71 |
| 2008/0056720 A1* | 3/2008 | Sitton | H04B 10/27 398/98 |
| 2008/0085118 A1* | 4/2008 | Effenberger | H04J 14/0282 398/82 |
| 2008/0138072 A1* | 6/2008 | Sakamoto | H04J 14/0226 398/68 |
| 2008/0166127 A1* | 7/2008 | Kazawa | H04J 14/025 398/79 |
| 2008/0267627 A1 | 10/2008 | Effenberger | |
| 2009/0016726 A1* | 1/2009 | Suzuki | H04B 10/0793 398/79 |
| 2009/0129773 A1* | 5/2009 | Oron | H04B 10/0793 398/10 |
| 2009/0196240 A1 | 8/2009 | Frederiksen et al. | |
| 2009/0322233 A1 | 12/2009 | Sone | |
| 2010/0208335 A1* | 8/2010 | Yoshida | H01S 5/50 359/344 |
| 2010/0272433 A1* | 10/2010 | Shaffer | H04B 10/0773 398/17 |
| 2012/0008958 A1* | 1/2012 | Dahlfort | H04J 14/0282 398/85 |
| 2012/0128358 A1* | 5/2012 | Zhang | H04B 10/0773 398/63 |
| 2012/0155863 A1* | 6/2012 | Rohde | H04J 14/0221 398/34 |
| 2012/0219287 A1* | 8/2012 | Treyer | H04J 14/0278 398/27 |
| 2012/0251122 A1* | 10/2012 | Grobe | H04J 14/0221 398/95 |
| 2013/0058651 A1* | 3/2013 | Treyer | H04B 10/60 398/58 |
| 2013/0094861 A1* | 4/2013 | Luo | H04J 14/0278 398/68 |
| 2013/0094862 A1* | 4/2013 | Luo | H04J 14/0278 398/68 |
| 2013/0148972 A1* | 6/2013 | Kazawa | H04B 10/27 398/100 |

FOREIGN PATENT DOCUMENTS

| | | |
|---|---|---|
| CN | 101621723 A | 1/2010 |
| CN | 101820557 A | 9/2010 |
| CN | 102388557 A | 3/2012 |
| EP | 1978653 A1 | 10/2008 |
| EP | 2753010 A1 | 7/2014 |
| JP | 2008172351 A | 7/2008 |
| JP | 2009182997 A | 8/2009 |
| KR | 100811423 B1 | 3/2008 |
| KR | 20080052332 A | 6/2008 |
| KR | 20080086247 A | 9/2008 |
| RU | 2142672 C1 | 12/1999 |
| RU | 2490829 C2 | 8/2013 |
| WO | WO 2008092160 A2 | 7/2008 |
| WO | WO 2010064981 A1 | 6/2010 |
| WO | WO 2011050855 A1 | 5/2011 |
| WO | WO 2012136153 A1 | 10/2012 |

* cited by examiner

| ONU identifier 2 bytes | Message identifier 1 byte | Sequence number 1 byte | Data 36 bytes | Integrity check 8 bytes |

WAVELENGTH CONFIGURATION METHOD AND APPARATUS FOR MULTI-WAVELENGTH PASSIVE OPTICAL NETWORK, AND MULTI-WAVELENGTH PASSIVE OPTICAL NETWORK SYSTEM

CROSS-REFERENCE TO RELATED APPLICATIONS

This application is a continuation of International Patent Application No. PCT/CN2012/076848, filed on Jun. 13, 2012, which is hereby incorporated by reference in its entirety.

TECHNICAL FIELD

The present application mainly relates to optical communications technologies, and in particular, to a wavelength configuration method and apparatus for a multi-wavelength passive optical network (Passive Optical Network, PON), and a multi-wavelength passive optical network system.

BACKGROUND

A passive optical network (PON) technology is currently a main broadband access technology. A conventional PON system is a point-to-multipoint network system based on a time division multiplexing (TDM) mechanism. Referring to FIG. 1, the PON system generally includes an optical line terminal (OLT) located on a central office side, multiple optical network units (ONU) located on a user side, and an optical distribution network (ODN) between the OLT and the ONUs. The ODN is used to distribute or multiplex data signals between the OLT and the ONUs so that the multiple ONUs can share an optical transmission path. In the PON system based on the TDM mechanism, a direction from the OLT to the ONUs is called downstream, the OLT broadcasts a downstream data stream to all the ONUs in a TDM manner, and each ONU receives only data that carries an identifier of the ONU; a direction from the ONUs to the OLT is called upstream. Because all the ONUs share the optical transmission path, in order to prevent a conflict of upstream data between the ONUs, the PON system uses a Time Division Multiple Access (TDMA) manner in the upstream direction. That is, the OLT allocates a timeslot to each ONU, and each ONU sends upstream data in strict accordance with the timeslot allocated by the OLT.

However, the PON system is affected by a time division characteristic of the TDM mechanism, and available bandwidth of a user is generally restricted. In addition, available bandwidth of a fiber itself cannot be effectively used. Therefore, emerging broadband network application service requirements cannot be satisfied. To solve such a problem and in view of compatibility with an existing PON system, a hybrid PON system that integrates a wavelength division multiplexing (WDM) technology and the TDM technology is put forward in the industry. In the hybrid PON, multiple wavelength channels are used between an OLT on a central office side and ONUs on a user side to receive and send data. That is, the hybrid PON system is a multi-wavelength PON system.

In the multi-wavelength PON system, the OLT supports data sending and receiving performed simultaneously by using multiple wavelength channels. Each ONU works on one of the wavelength channels separately. In the downstream direction, the OLT uses a downstream wavelength corresponding to each wavelength channel to broadcast downstream data to multiple ONUs that work on the wavelength channel; in the upstream direction, an ONU on each wavelength channel may send, in a timeslot allocated by the OLT, upstream data to the OLT through an upstream wavelength of the wavelength channel. In order to reduce warehousing costs, the ONU generally uses a wavelength-tunable optical transceiver component. Therefore, an operating wavelength needs to be configured for the ONU during initialization. However, if a downstream receiving wavelength or an upstream sending wavelength configured by the ONU is not supported by the OLT, the ONU cannot register successfully.

SUMMARY

The present application provides a wavelength configuration method for a multi-wavelength passive optical network, where the method can effectively ensure normal ONU registration. In addition, based on the wavelength configuration method, the present application further provides a multi-wavelength passive optical network system and a wavelength configuration apparatus for the multi-wavelength passive optical network system.

A wavelength configuration method for a multi-wavelength passive optical network includes: scanning, by an ONU, a downstream receiving wavelength, and receiving, during the process of scanning the downstream receiving wavelength, downstream wavelength information of each downstream wavelength channel that is broadcast by an OLT separately through each downstream wavelength channel of a multi-wavelength passive optical network system; establishing, by the ONU, a downstream receiving wavelength mapping table according to the downstream wavelength information, where an entry of the downstream receiving wavelength mapping table includes downstream receiving wavelength information, drive current information of a downstream optical receiver, and a receiving optical physical parameter of the ONU; and selecting, by the ONU, one downstream wavelength from the downstream wavelength information broadcast by the OLT, and setting, according to the drive current information of the downstream optical receiver recorded in a related entry of the downstream receiving wavelength mapping table, an operating wavelength of the downstream optical receiver to the selected downstream wavelength.

A wavelength configuration apparatus for a multi-wavelength passive optical network includes: a receiving module, configured to scan a downstream receiving wavelength, and receive, during the process of scanning the downstream receiving wavelength, downstream wavelength information of each downstream wavelength channel that is broadcast by an OLT separately through each downstream wavelength channel of a multi-wavelength passive optical network system; a wavelength mapping table establishing module, configured to establish a downstream receiving wavelength mapping table according to the downstream wavelength information, where an entry of the downstream receiving wavelength mapping table includes downstream receiving wavelength information, drive current information of a downstream optical receiver, and a receive optical physical parameter of an ONU; and a wavelength configuration module, configured to select one downstream wavelength from the downstream wavelength information broadcast by the OLT, and set, according to the drive current information of the downstream optical receiver recorded in a related entry of the downstream receiving wavelength mapping table, an operating wavelength of the downstream optical receiver to the selected downstream wavelength.

A multi-wavelength passive optical network system includes: at least one OLT and multiple ONUs. The at least one OLT is connected to the multiple ONUs in a point-to-multipoint manner through an optical distribution network. The ONU includes the foregoing wavelength configuration apparatus for a multi-wavelength passive optical network.

In the wavelength configuration method and apparatus for a multi-wavelength PON and the multi-wavelength PON system provided in the present application, an ONU scans a wavelength and interacts with an OLT during an initialization process, establishes a corresponding wavelength mapping table, so as to ensure that a transceiver wavelength configured by the ONU is within a wavelength range supported by the OLT, thereby implementing normal initialization of the ONU transceiver wavelength.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
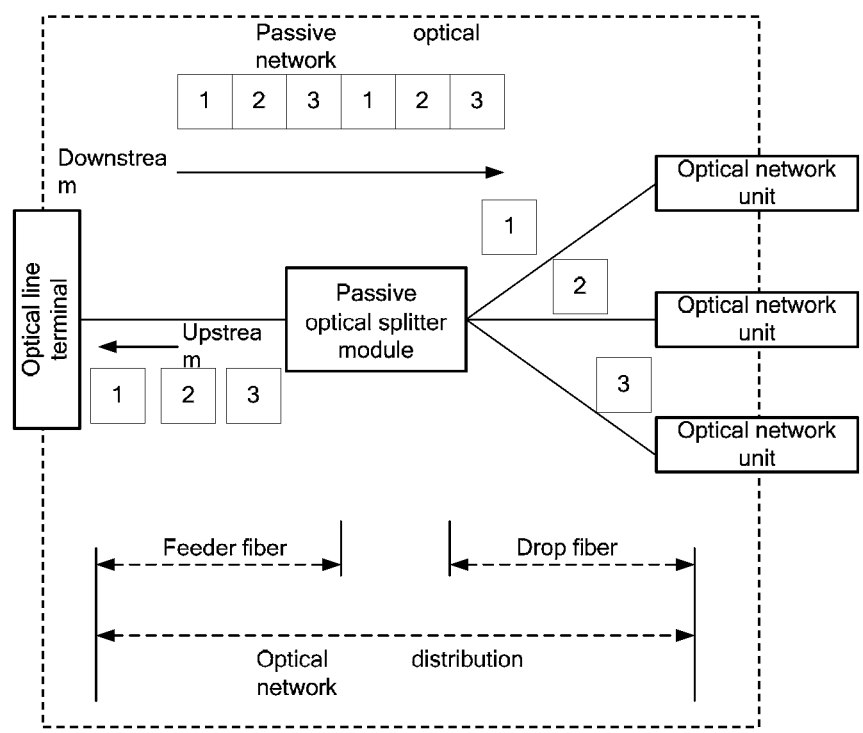
FIG. 1 is a schematic diagram of a network architecture of a passive optical network system based on a time division multiplexing mechanism.
Figure 2:
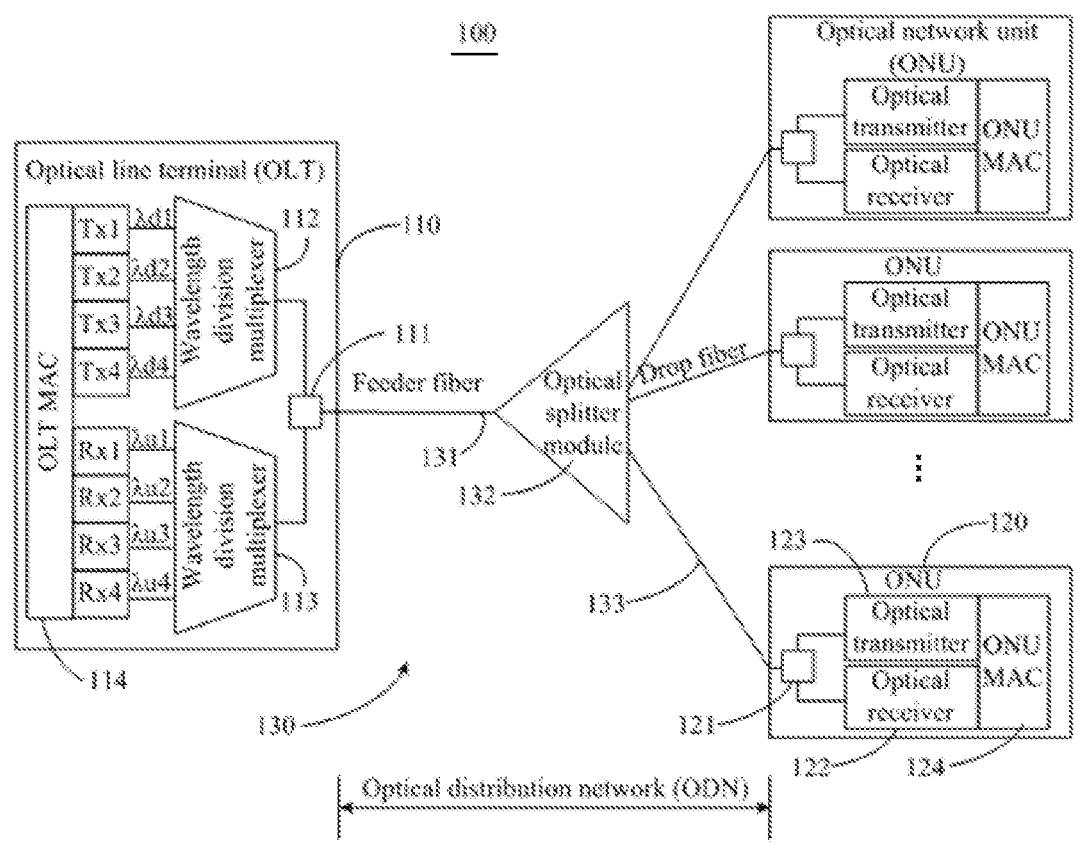
FIG. 2 is a schematic diagram of a network architecture of a multi-wavelength passive optical network system according to an embodiment of the present application.

Refer to FIG. 2, which is a schematic diagram of a network architecture of a multi-wavelength passive optical network system 100 according to an embodiment of the present application. The multi-wavelength PON system 100 includes at least one optical line terminal (OLT) 110, multiple optical network units (ONU) 120, and one optical distribution network (ODN) 130, where the OLT 110 is connected to the multiple ONUs 120 in a point-to-multipoint manner by using the ODN 130, and the multiple ONUs 120 share an optical transmission medium of the ODN 130. The ODN 130 may include a feeder fiber 131, an optical splitter module 132, and multiple drop fibers 133, where the optical splitter module 132 may be disposed at a remote node (RN). The optical splitter module is connected to the OLT 110 by using the feeder fiber 131 on the one hand and connected to the multiple ONUs 120 separately by using the multiple drop fibers 133 on the other hand.

In the multi-wavelength PON system 100, a communication link between the OLT 110 and the multiple ONUs 120 may include multiple upstream wavelength channels and multiple downstream wavelength channels. In a downstream direction, the multiple downstream wavelength channels also share the optical transmission medium of the ODN in a wavelength division multiplexing (WDM) manner, each ONU 120 may work on one of the downstream wavelength channels of the multi-wavelength PON system 100, and each downstream wavelength channel may carry downstream services of one or more ONUs 120; the ONUs 120 that work on a same downstream wavelength channel may share the downstream wavelength channel in a Time Division Multiple Access (TDMA) manner. In an upstream direction, the multiple upstream wavelength channels share the optical transmission medium of the ODN 130 in a WDM manner, each ONU 120 may work on one of the upstream wavelength channels of the multi-wavelength PON system 100, and each upstream wavelength channel may carry upstream services of one or more ONUs 120; the ONUs 120 that work on a same upstream wavelength channel may share the upstream wavelength channel in a Time Division Multiple Access (TDMA) manner.

In this embodiment, as shown in FIG. 2, a description is given by using an example in which the multi-wavelength PON system 100 has four upstream wavelength channels and downstream wavelength channels. It should be understood that, in actual application, the number of upstream and downstream wavelength channels of the multi-wavelength PON system 100 may also be determined according to network requirements. For ease of description, in this embodiment, the four upstream wavelength channels of the multi-wavelength PON system 100 are separately named an upstream wavelength channel 1 (which uses a first upstream wavelength λu1), an upstream wavelength channel 2 (which uses a second upstream wavelength λu2), an upstream wavelength channel 3 (which uses a third upstream wavelength λu3), and an upstream wavelength channel 4 (which uses a fourth upstream wavelength λu4); the four downstream wavelength channels of the multi-wavelength PON system 100 are separately named a downstream wavelength channel 1 (which uses a first downstream wavelength λd1), a downstream wavelength channel 2 (which uses a second downstream wavelength λd2), a downstream wavelength channel 3 (which uses a third downstream wavelength λd3), and a downstream wavelength channel 4 (which uses a fourth downstream wavelength λd4).

Each upstream wavelength channel and each downstream wavelength channel may have a corresponding wavelength channel identifier (for example, a channel number). That is, there is a matching relationship between the upstream wavelength channel identifier and an upstream wavelength of an upstream wavelength channel identified by the upstream wavelength channel identifier, and the OLT 110 and the ONUs 120 may learn the upstream wavelength of the upstream wavelength channel according to the upstream wavelength channel identifier. Similarly, there is also a relationship between the downstream wavelength channel identifier and a downstream wavelength of a downstream wavelength channel identified by the downstream wavelength channel identifier, and the OLT 110 and the ONUs 120 may learn the downstream wavelength of the downstream wavelength channel according to the downstream wavelength channel identifier.

In an embodiment, referring to FIG. 2, the OLT 110 may include an optical coupler 111, a first wavelength division multiplexer 112, a second wavelength division multiplexer 113, multiple downstream optical transmitters Tx1-Tx4, multiple upstream optical receivers Rx1-Rx4, and a processing module 114. The multiple downstream optical transmitters Tx1-Tx4 are connected to the optical coupler 111 by using the first wavelength division multiplexer 112, the multiple upstream optical receivers Rx1-Rx4 are connected to the optical coupler 111 by using the second wavelength division multiplexer 113, and the coupler 111 is further connected to the feeder fiber 131 of the ODN 130.

Transmit wavelengths vary between the multiple downstream optical transmitters Tx1-Tx4. Each of the downstream optical transmitters Tx1-Tx4 may correspond to one of the downstream wavelength channels of the multi-wavelength PON system 100. For example, the transmit wavelengths of the multiple downstream optical transmitters Tx1-Tx4 may be $\lambda d1$-$\lambda d4$ respectively. The downstream optical transmitters Tx1-Tx4 may use their respective transmit wavelengths $\lambda d1$-$\lambda d4$ to transmit downstream data to corresponding downstream wavelength channels separately, so that the downstream data is received by the ONUs 120 that work on the downstream wavelength channels Correspondingly, receiving wavelengths may vary between the multiple upstream optical receivers Rx1-Rx4. Each of the upstream optical receivers Rx1-Rx4 also corresponds to one of the upstream wavelength channels of the multi-wavelength passive optical network system 100. For example, the receiving wavelengths of the multiple upstream optical receivers Rx1-Rx4 may be $\lambda u1$-$\lambda u4$ respectively. The upstream optical receivers Rx1-Rx4 may use their respective receiving wavelengths $\lambda u1$-$\lambda u4$ to receive upstream data sent by the ONUs 120 that work on the corresponding upstream wavelength channels.

The first wavelength division multiplexer 112 is configured to: perform wavelength division multiplexing processing on the downstream data that is transmitted by the multiple downstream optical transmitters Tx1-Tx4 and whose wavelengths are $\lambda d1$-$\lambda d4$; and send the downstream data to the feeder fiber 131 of the ODN 130 through the optical coupler 111, so as to provide the downstream data for the ONUs 120 by using the ODN 130. In addition, the optical coupler 111 may further be configured to provide the second wavelength division multiplexer 113 with the upstream data that come from the multiple ONUs 120 and whose wavelengths are $\lambda u1$-$\lambda u4$, and the second wavelength division multiplexer 113 may demultiplex the upstream data whose wavelengths are $\lambda u1$-$\lambda u4$ to the upstream optical receivers Rx1-Rx4 to perform data receiving.

The processing module 114 may be a Media Access Control (Media Access Control, MAC) module. On the one hand, according to a downstream wavelength channel on which an ONU 120 works, the processing module 114 may provide downstream data that is to be sent to the ONU 120 for a downstream optical transmitter corresponding to the downstream wavelength channel, so that the downstream optical transmitter transmits the downstream data to the wavelength channel; on the other hand, the processing module 114 may also process the upstream data received by each of the upstream optical receivers Rx1-Rx4.

Operating wavelengths (including an upstream sending wavelength and a downstream receiving wavelength) of the ONU 120 are tunable. In a specific embodiment, the ONU 120 may include an optical coupler 121, a downstream optical receiver 122, an upstream optical transmitter 123, and a processing module 124. Both the downstream optical receiver 122 and the upstream optical transmitter 123 are wavelength-tunable components, and they may be connected to a drop fiber corresponding to the ONU 120 by using the optical coupler 121. On the one hand, the optical coupler 121 may provide the drop fiber 133 of the ODN 130 with the upstream data sent by the upstream optical transmitter 123, so as to send the upstream data to the OLT 110 through the ODN 130; on the other hand, the optical coupler 121 may further provide the downstream optical receiver 122 with the downstream data sent by the OLT 110 through the ODN 130, so as to perform data receiving.

The processing module 124 may be a MAC module. On the one hand, the processing module 124 may control, according to needs, the downstream optical receiver 122 and the upstream optical transmitter 123 to perform wavelength adjustment. On the other hand, the processing module 124 may provide, in a specified timeslot, the upstream optical transmitter 123 with the upstream data to be sent to the OLT 110, so that the upstream optical transmitter 123 sends the upstream data to the OLT 110 through a corresponding upstream wavelength channel, and the processing module 124 processes the downstream data received by the downstream optical receiver 122.

In the multi-wavelength PON system, because the OLT 110 supports multiple upstream and downstream wavelength channels and the operating wavelengths of the ONU 120 are tunable, in order to implement normal registration, a downstream receiving wavelength and an upstream sending wavelength need to be first configured for the ONU 120 according to a wavelength capability supported by the OLT 110 during initialization. A wavelength configuration method for a multi-wavelength PON system according to an embodiment of the present invention can ensure correct initialization of an operating wavelength of an ONU.

Figure 3:
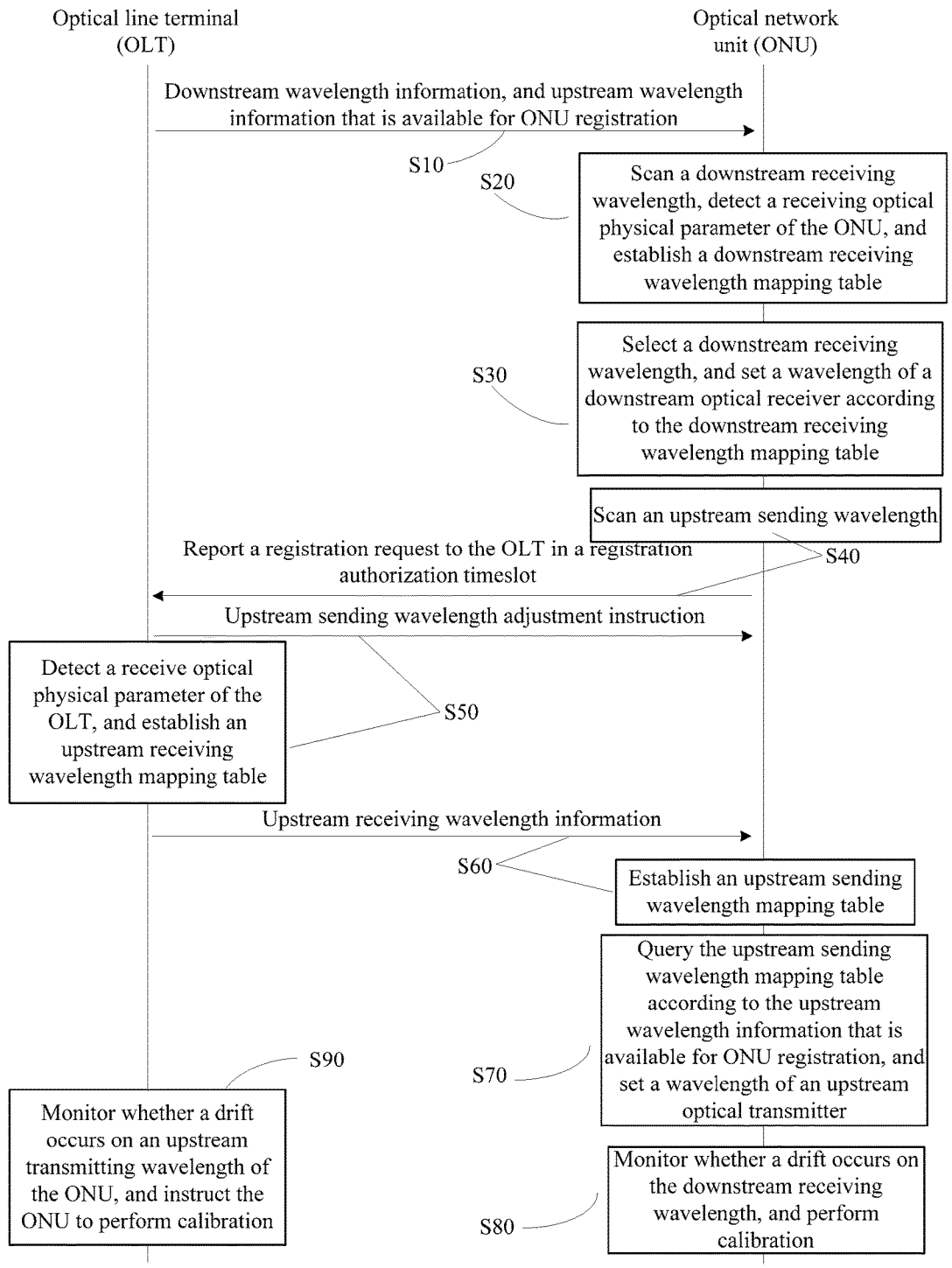
FIG. 3 is a flowchart of a wavelength switching method for a multi-wavelength passive optical network according to a first embodiment of the present application.

FIG. 3 is a flowchart of a wavelength configuration method for a multi-wavelength passive optical network according to an embodiment of the present application. The wavelength configuration method may include:

Step S10: An OLT periodically broadcasts, on each downstream wavelength channel of a multi-wavelength PON system, downstream wavelength information of each downstream wavelength channel and information of an upstream wavelength that is available for ONU registration.

In one aspect, a MAC module of the OLT on a central office side may provide the downstream wavelength information of each downstream wavelength channel for corresponding downstream optical transmitters Tx1-Tx4 separately, and control the downstream optical transmitters Tx1-Tx4 to periodically broadcast the downstream wavelength information to ONUs on a user side through each downstream wavelength channel. Because each downstream wavelength channel corresponds to a specific downstream wavelength, in an embodiment, the downstream wavelength information broadcast by the OLT on each wavelength channel may be channel identifier information of the downstream wavelength channel, such as a downstream wavelength channel number.

In another aspect, the MAC module of the OLT may further obtain, with reference to the number of ONUs that are actually online on each upstream wavelength channel and according to an algorithm for balancing the numbers of ONUs on wavelength channels, the upstream wavelength information that is available for ONU registration, that is, available-upstream-wavelength information. In addition, the MAC module may provide the upstream wavelength information for the downstream optical transmitters Tx1-Tx4, so that the downstream optical transmitters Tx1-Tx4 implement broadcasting of the available-upstream-wavelength information simultaneously when broadcasting the downstream wavelength through each downstream wavelength channel.

In an embodiment, the downstream wavelength information and the upstream wavelength information may be carried by an XGPON transmission convergence (XGTC) frame, a GPON transmission convergence (GTC) frame or an Ethernet frame (that is, EPON frame) having a logic link identifier (LLID).

Figures 4, 5:
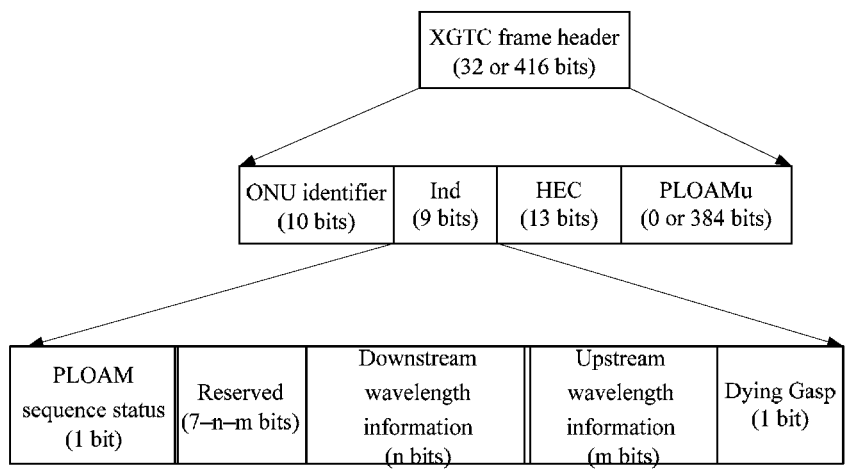
FIG. 4 is a schematic diagram in which an XGTC frame is used to carry wavelength information in the wavelength switching method for a multi-wavelength passive optical network shown in FIG. 3.
FIG. 5 is a schematic diagram in which a PLOAM message is used to carry wavelength information in the wavelength switching method for a multi-wavelength passive optical network shown in FIG. 3.

An example is used, in which an XGTC frame is used to carry the downstream wavelength information and the upstream wavelength information. Referring to FIG. 4, the XGTC frame includes an XGTC frame header and an XGTC payload, where the XGTC frame header includes an optical network unit identifier (ONU-ID) field, an indication (Ind) field, a hybrid error correction (HEC) field and a physical layer operations, administration and maintenance upstream (PLOAMu) field, where the downstream wavelength information and the upstream wavelength information may be carried by the Ind field. For example, a reserved (Reserve) field of 9 bits is reserved in the Ind field of the XGTC frame header defined in an existing XGPON standard. In this embodiment, the downstream wavelength information and the upstream wavelength information may be carried by the reserved field in the Ind field of the XGTC frame header.

In another embodiment, the downstream wavelength information and the upstream wavelength information may be carried by a physical layer operations, administration and maintenance (PLOAM) message, an ONT management and control interface (OMCI) message, a Multi-Point Control Protocol (MPCP) message or an operation, administration and maintenance (OAM) message. A specific message format, such as a field value and a field length, may be determined according to actual needs. Certainly, in another alternative embodiment, the OLT 110 may also carry a downstream wavelength switching command by a newly defined message.

An example is used, in which a PLOAM message is used to carry the downstream wavelength information and the upstream wavelength information. Referring to FIG. 5, FIG. 5 is a schematic diagram of a message format of the PLOAM message. The PLOAM message usually includes an optical network unit identifier (ONU ID) field, a message identifier (Message ID) field, a sequence number (Sequence No) field, a data (Data) field, and an integrity check (Integrity Check) field. In this embodiment, the downstream wavelength information and the upstream wavelength information may be carried in the data field of the PLOAM message. For example, the PLOAM message may use the format shown in the table below:

| Byte (Octet) | Content (Content) |
|---|---|
| 1-2 | ONU identifier (ONU ID) |
| 3 | Message identifier (Message ID) |
| 4 | Sequence number (Sequence No) |
| 5-a | Downstream wavelength information (OLT Tx Wavelength) |
| (a + 1)-b | Upstream wavelength information (ONU registration Wavelength) |
| (b + 1)-40 | Reserved (Reserved) |
| 41-48 | Message integrity check (MIC) |

Step S20: An ONU scans a downstream receiving wavelength, receives a downstream receiving optical physical parameter, and establishes a downstream receiving wavelength mapping table, where an entry of the downstream receiving wavelength mapping table includes downstream receiving wavelength information, drive current information of a downstream optical receiver, and a receiving optical physical parameter of the ONU.

Specifically, the ONU may scan the downstream receiving wavelength within a maximum receiving wavelength range of the wavelength-tunable downstream optical receiver of the ONU. For example, the ONU adjusts a drive current of the downstream optical receiver to gradually change the downstream receiving wavelength, and receives a downstream optical signal broadcast on each downstream wavelength channel during the process of scanning the downstream receiving wavelength. In addition, the tunable optical receiver may provide a MAC module of the ONU with its received message (such as a PLOAM message) that carries the downstream wavelength information and the upstream wavelength information, or a data frame (such as an XGTC frame) that carries the downstream wavelength information and the upstream wavelength information.

In an embodiment, the receiving optical physical parameter of the ONU may be a peak value of a receiving optical current of the ONU (that is, a photo-generated current of the downstream optical receiver of the ONU). The ONU detects the receiving optical current of the ONU during the process of scanning the downstream receiving wavelength, and searches for the peak value of the receive optical current of the ONU. When the peak value of the receive optical current of the ONU is searched out, the ONU may record a current drive current of the downstream optical receiver and downstream wavelength information that is of a downstream wavelength channel on which the ONU is currently located and that is extracted from a message or a data frame received from the MAC module, and establish a downstream receiving wavelength mapping entry according to the foregoing three parameters, that is, the downstream receiving wavelength mapping entry includes the downstream receiving wavelength information, the drive current information of the downstream optical receiver, and the peak value of the receiving optical current of the ONU.

In another embodiment, the receiving optical physical parameter of the ONU may also be a peak value of receive optical power of the ONU or received signal strength indication (Received Signal Strength Indication, RSSI) information. The ONU detects the receive optical power of the ONU or RSSI during the process of scanning the downstream receiving wavelength, and searches for and detects a peak value of the receive optical power of the ONU or an RSSI peak value. When the peak value of the receive optical power of the ONU or the RSSI peak value is searched out, the ONU may record a current drive current of the downstream optical receiver and downstream wavelength information that is of a downstream wavelength channel on which the ONU is currently located and that is extracted from a message or a data frame received from the MAC module, and establish a downstream receiving wavelength mapping entry according to the foregoing three parameters, that is, the downstream receiving wavelength mapping entry includes the downstream receiving wavelength information, the drive current information of the downstream optical receiver, and the peak value of the receiving optical current of the ONU or the RSSI peak value. Certainly, it should be understood that, in another alternative embodiment, the receiving optical physical parameter of the ONU may also be another related receiving optical physical parameter of the ONU. Correspondingly, the ONU detects the physical parameter during the process of scanning the downstream receiving wavelength, and establishes a downstream receiving wavelength mapping entry according to the detected physical parameter.

By repeating the foregoing process, the downstream receiving wavelength scanning of the ONU may traverse all downstream receiving wavelengths supported by the downstream optical receiver or the whole downstream receiving wavelength range of the downstream optical receiver, and establish one or more downstream receiving wavelength mapping entries. After the foregoing downstream receiving wavelength scanning is completed, the ONU may establish the downstream receiving wavelength mapping table including one or more entries, and each entry therein corresponds to different downstream receiving wavelengths.

Step S30: The ONU selects one downstream receiving wavelength, and sets, according to the drive current information of the downstream optical receiver recorded in a related entry of the downstream receiving wavelength mapping table, an operating wavelength of the downstream optical receiver of the ONU to the selected downstream receiving wavelength.

For example, after establishing the downstream receiving wavelength mapping table, the ONU may select one downstream receiving wavelength according to a preset wavelength configuration requirement or randomly, and search the downstream receiving wavelength mapping table to obtain the drive current information of the downstream optical receiver from an entry corresponding to the selected downstream receiving wavelength, and adjust the drive current of the downstream optical receiver according to the drive current information of the downstream optical receiver, thereby setting the downstream receiving wavelength of the downstream optical receiver to the foregoing selected downstream receiving wavelength.

Step S40: The ONU scans an upstream sending wavelength, and reports a registration request to the OLT in a registration authorization timeslot provided by the OLT.

In an embodiment, a starting condition of this step may be set to: the ONU may correctly receive registration authorization information broadcast by the OLT through the downstream wavelength channel, but has not been registered normally. An ending condition of this step may be set to: the ONU registers successfully; or, the ONU receives an upstream sending wavelength adjustment stop instruction delivered by the OLT.

Specifically, the ONU usually does not know a current upstream sending wavelength of a tunable upstream optical transmitter of the ONU during initialization, and is not sure whether an upstream optical signal sent through the current upstream sending wavelength can be received by the OLT normally. Therefore, in this embodiment, the ONU may gradually change the drive current within a value range of drive currents supported by the upstream optical transmitter of the ONU, so as to scan the upstream sending wavelength.

For example, during the initialization, the ONU may select one boundary value from the value range of the drive currents as an initial current value, and perform a progressive increase or decrease on a basis of the initial current value by a preset variation until the drive current value reaches the other boundary value within the value range. In this process, the upstream sending wavelength of the upstream optical transmitter is gradually adjusted with the progressive increase or decrease of the drive current, thereby implementing the scanning of the upstream sending wavelength of the upstream optical transmitter. After the drive current value reaches the other boundary value within the value range, if the foregoing ending condition is not met at present, the ONU may adjust the drive current of the upstream optical transmitter to be the original boundary value (that is, the initial current value) again, and continue to scan the upstream sending wavelength again.

During the process of scanning the upstream sending wavelength, the downstream optical receiver of the ONU may receive, through the foregoing selected downstream receiving wavelength, the registration authorization information broadcast by the OLT through a corresponding downstream wavelength channel. Therefore, the ONU may notify its upstream optical transmitter that, within the registration authorization timeslot provided by the OLT for the ONU, an ONU registration request may be sent to the OLT according to an upstream sending wavelength corresponding to the drive current value to which the drive current of the upstream optical transmitter is currently adjusted.

After the ONU registration request is sent, the MAC module of the ONU may further determine whether an ONU identifier (ONU ID) allocation message fed back by the OLT is received during a preset period of time. If the ONU ID allocation message cannot be received during the preset period of time, the MAC module may consider that the OLT does not support the current upstream sending wavelength of the upstream optical transmitter (that is, the ONU cannot register normally when the upstream sending wavelength is used), and may continue to adjust the drive current of the upstream optical transmitter according to the foregoing scanning rule, control the upstream optical transmitter to maintain the foregoing upstream sending wavelength scanning, and send the ONU registration request to the OLT again in a next registration authorization timeslot allocated by the OLT, until the ONU ID allocation message sent by the OLT is successfully received (that is, the ONU successfully registers).

Step S50: The OLT delivers an upstream sending wavelength adjustment instruction to the ONU, detects a receive optical physical parameter of the OLT during a process of adjusting the upstream sending wavelength of the ONU, and establishes an upstream receiving wavelength mapping table, where an entry of the upstream receiving wavelength mapping table includes upstream receiving wavelength information, the receive optical physical parameter of the OLT, and ONU sequence number information.

In a specific embodiment, the receiving optical physical parameter of the OLT may be a peak value of a receiving optical current of the OLT, a peak value of receiving optical power of the OLT, or an RSSI peak value. The peak value of the receiving optical current of the OLT is taken as an example. During the ONU registration process, the OLT may detect a receiving optical current of the OLT corresponding to an upstream optical signal sent by the ONU (that is, a photo-generated current of an upstream optical receiver of the OLT), and record the receiving optical current of the OLT. In addition, after the ONU completes registration, the OLT may increase the number of times of registration of the ONU on the wavelength channel. In another aspect, the OLT may deliver the upstream sending wavelength adjustment instruction to the ONU, so as to instruct the ONU to fine-tune the upstream sending wavelength according to the upstream sending wavelength scanning rule in the foregoing step S40. The ONU may gradually adjust the drive current of the upstream optical transmitter, so as to implement fine-tuning of the upstream sending wavelength, until an upstream sending wavelength adjustment stop instruction delivered by the OLT is received.

The OLT may detect the photo-generated current for the upstream optical signal sent by the ONU through a corresponding upstream wavelength channel during the process of fine-tuning the upstream sending wavelength of the ONU, thereby obtaining and recording a value of the receiving optical current of the OLT. Further, the MAC module of the OLT may find a peak value of the receiving optical current of the OLT among a series of values of the receiving optical current of the OLT recorded by the MAC module, and establish an upstream receiving wavelength mapping entry according to the peak value of the receiving optical current of the OLT and upstream wavelength information corresponding to the peak value. The upstream receiving wavelength mapping entry may include upstream receiving wavelength information, information about the peak value of the receiving optical current of the OLT, and the ONU sequence number information. The upstream receiving wavelength information may be channel identifier information (such as a wavelength channel number) of the upstream wavelength channel or the upstream wavelength information of the wavelength channel when the OLT detects the peak value of the receiving optical current, where the upstream optical signal is carried by the upstream wavelength channel.

It should be understood that, in another alternative embodiment, if the receiving optical physical parameter of the OLT uses the peak value of the receiving optical power of the OLT or the RSSI peak value or another physical parameter, the OLT may detect a related physical parameter during the process of fine-tuning the upstream sending wavelength of the ONU, and the information about the peak value of the receiving optical current of the OLT in an upstream receiving wavelength mapping entry correspondingly established by the OLT is replaced by the peak value of the receiving optical power of the OLT or the RSSI peak value or the another physical parameter.

By repeating the foregoing process, the upstream sending wavelength scanning of the ONU may traverse all upstream sending wavelengths supported by the upstream optical transmitter or a whole upstream sending wavelength range of the upstream optical transmitter. Therefore, the OLT may establish one or more upstream receiving wavelength mapping entries. After the foregoing upstream sending wavelength scanning is completed, the OLT may establish the upstream receiving wavelength mapping table including one or more entries, and each entry therein corresponds to different upstream receiving wavelengths.

Step S60: The OLT sends the upstream receiving wavelength information to the ONU, and the ONU establishes an upstream sending wavelength mapping table according to the upstream receiving wavelength information, where an entry of the upstream sending wavelength mapping table includes upstream sending wavelength information and drive current information of an upstream optical transmitter.

For example, when the OLT finds that the ONU performs registration on one same upstream wavelength channel for the second time, the MAC module of the OLT may compare a currently detected value of the receive optical current of the OLT with the recorded peak value of the receive optical current of the OLT, so as to determine whether a deviation between them is less than a preset threshold. If the deviation is less than the threshold, it may be considered that the current upstream sending wavelength of the ONU is aligned with the current upstream receiving wavelength of the OLT, and the OLT may send the upstream wavelength information that is of the upstream wavelength channel and corresponds to the peak value of the receiving optical current of the OLT to the ONU. After the ONU receives the upstream wavelength information, the ONU may establish a corresponding upstream sending wavelength mapping table, where an entry of the upstream sending wavelength mapping table may include the upstream sending wavelength information (that is, the upstream wavelength information provided by the OLT) and the drive current information of the upstream optical transmitter of the ONU.

When the OLT finds the ONU registers at one same wavelength channel for the third time, the OLT may consider that the ONU has completed establishing the upstream sending wavelength mapping table. In this case, the OLT may send the upstream sending wavelength scanning stop instruction to the ONU, so as to instruct the ONU to stop the foregoing upstream sending wavelength scanning. In addition, the OLT may further reset the number of registration times of the ONU on the upstream wavelength channel to zero.

Step S70: The ONU queries, according to the upstream wavelength information that is broadcast by the OLT downstream and is available for ONU registration, the drive current information of the upstream optical transmitter recorded in a related entry of the upstream sending wavelength mapping table, and sets an upstream sending wavelength of the upstream optical transmitter according to the drive current information.

After the ONU receives the upstream sending wavelength scanning stop instruction delivered by the OLT, the ONU may query, according to the upstream wavelength information that is parsed by the MAC module and is available for ONU registration, the related entry of the upstream sending wavelength mapping table established by the ONU; obtain the drive current information of the upstream optical transmitter recorded in the entry corresponding to the upstream wavelength information that is provided by the OLT and is available for ONU registration; and set the drive current of the upstream optical transmitter according to the drive current information. Therefore, the upstream sending wavelength of the upstream optical transmitter is set to the upstream wavelength that is parsed by the MAC module and is available for ONU registration.

Optionally, in a specific embodiment, the wavelength configuration method for a multi-wavelength passive optical network may further include:

Step S80: The ONU detects, according to the downstream receiving wavelength mapping table, whether a drift occurs on the downstream receiving wavelength of the downstream optical receiver, and calibrates the downstream receiving wavelength when the drift occurs.

Specifically, during a normal communication process, the ONU may monitor the receiving optical current of the ONU (or the receiving optical power of the ONU or the RSSI), and compare a value of the monitored receiving optical current of the ONU (or a value of the receiving optical power of the ONU or an RSSI value) with the peak value of the receiving optical current of the ONU (or the peak value of the receiving optical power of the ONU or the RSSI peak value) recorded in the related entry of the downstream receiving wavelength mapping table. If a deviation between them is greater than a preset threshold, it is considered that a drift occurs on the downstream receiving wavelength of the downstream optical receiver of the ONU. In this case, the ONU may randomly select one direction to adjust the downstream receiving wavelength of the downstream optical receiver, and continue to measure the receiving optical current of the ONU (or the value of the receiving optical power of the ONU or the RSSI value) during the adjustment process. If the value of the measured receiving optical current of the ONU (or the value of the receiving optical power of the ONU or the RSSI value) is decreased, the downstream receiving wavelength is adjusted in an opposite direction until a deviation between the value of the measured receiving optical current of the ONU (or the value of the receiving optical power of the ONU or the RSSI value) and the peak value of the receiving optical current of the ONU (or the peak value of the receiving optical power of the ONU or the RSSI peak value) is less than the preset threshold.

Step S90: The OLT monitors, according to the upstream receiving wavelength mapping table, whether a drift occurs on an upstream sending wavelength of the ONU, and instructs the ONU to calibrate the upstream sending wavelength when the drift occurs.

Specifically, during a normal communication process, the OLT may monitor the receiving optical current of the OLT (or the receiving optical power of OLT or the RSSI), and compare a value of the monitored receiving optical current of the OLT (or a value of the receiving optical power of the OLT or an RSSI value) with the peak value of the receiving optical current of the OLT (or the peak value of the receiving optical power of the OLT or the RSSI peak value) recorded in the related entry of the upstream receiving wavelength mapping table. If a deviation between them is greater than a preset threshold, it is considered that a drift occurs on the upstream sending wavelength of the upstream optical transmitter of the ONU. In this case, the OLT may deliver a wavelength adjustment instruction to the ONU, so as to instruct the ONU to randomly select one direction to adjust the upstream sending wavelength of the upstream optical transmitter. The OLT continues to measure the receiving optical current of OLT (or the value of the receiving optical power of the OLT or the RSSI value) during the process of adjusting the upstream sending wavelength the ONU. If it is measured that the value of the receiving optical current of the OLT (or the value of the receiving optical power of the OLT or the RSSI value) is decreased, the OLT delivers the wavelength adjustment instruction to the ONU again, so as to instruct the ONU to adjust the upstream sending wavelength in an opposite direction, until a deviation between the value of the measured receiving optical current of the OLT (or the value of the receiving optical power of the OLT or the RSSI value) and the peak value of the receiving optical current of the OLT (or the peak value of the receiving optical power of the OLT or the RSSI peak value) is less than the preset threshold.

In the wavelength configuration method for a multi-wavelength passive optical network according to the embodiment of the present application, an ONU scans a wavelength and interacts with an OLT during an initialization process, and establishes a corresponding wavelength mapping table, so as to ensure that a transmitting wavelength and a receiving wavelength configured by the ONU are within a wavelength range supported by the OLT, thereby implementing normal initialization of the transmitting wavelength and the receiving wavelength of the ONU. In another aspect, whether a drift occurs on the transmitting wavelength and the receiving wavelength of the ONU can be monitored in real time based on the wavelength mapping table during a normal communication process, and auto-adjustment is performed when the drift occurs, thereby ensuring signal receiving quality and reducing a bit error rate.

Figure 6:
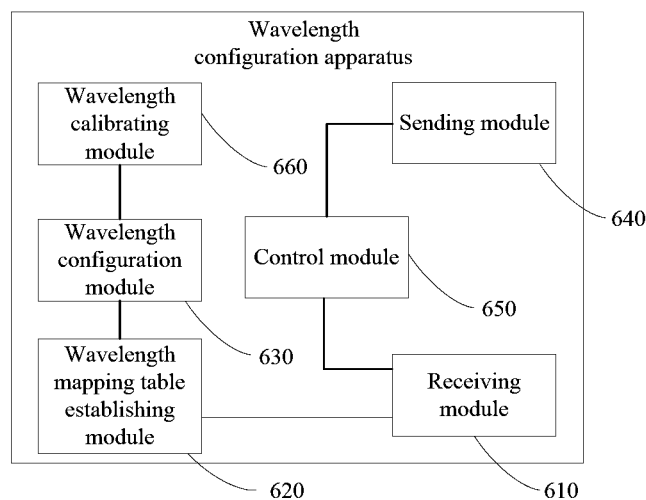
FIG. 6 is a schematic structural diagram of a wavelength switching apparatus for a multi-wavelength passive optical network according to an embodiment of the present application.

Based on the wavelength configuration method for a multi-wavelength passive optical network system according to the foregoing embodiment, the present application further provides a wavelength configuration apparatus. The wavelength switching apparatus may be applied to the ONUs 120 in the multi-wavelength passive optical network system 100 shown in FIG. 2. Referring to FIG. 6, FIG. 6 is a schematic structural diagram of a wavelength configuration apparatus 600 for a multi-wavelength passive optical network system according to an embodiment of the present application. The wavelength configuration apparatus 600 may include:

a receiving module 610, configured to scan a downstream receiving wavelength, and receive, during the process of scanning the downstream receiving wavelength, downstream wavelength information of each downstream wavelength channel that is broadcast by an OLT separately through each downstream wavelength channel of a multi-wavelength PON system;

a wavelength mapping table establishing module 620, configured to establish a downstream receiving wavelength mapping table according to the downstream wavelength information, where an entry of the downstream receiving wavelength mapping table includes downstream receiving wavelength information, drive current information of a downstream optical receiver, and a receiving optical physical parameter of an ONU; and a wavelength configuration module 630, configured to select one downstream wavelength from the downstream wavelength information broadcast by the OLT, and set, according to the drive current information of the downstream optical receiver recorded in a related entry of the downstream receiving wavelength mapping table, an operating wavelength of the downstream optical receiver to the selected downstream wavelength.

In a specific embodiment, the wavelength mapping table establishing module 620 may include:

a peak value searching unit 621, configured to search for a peak value of a receiving optical current of the ONU (or a peak value of receiving optical power of the ONU or an RSSI peak value) from a detected receiving optical current of the ONU (or receiving optical power of the ONU or RSSI) during the process of scanning the downstream receiving wavelength; and an entry establishing module 622, configured to: when the peak value searching unit searches out the peak value of the receiving optical current of the ONU (or the peak value of the receiving optical power of the ONU or the RSSI peak value), record a current drive current of the downstream optical receiver and downstream wavelength information of a downstream wavelength channel corresponding to the peak value of the receiving optical current of the ONU (or the peak value of the receiving optical power of the ONU or the RSSI peak value), and establish a downstream receiving wavelength mapping entry according to the foregoing three parameters.

Further, in an embodiment, the wavelength configuration apparatus 600 may further include:

a sending module 640, configured to scan an upstream sending wavelength, and send a registration request to the OLT in a registration authorization timeslot allocated by the OLT; and a control module 650, configured to: determine whether the receiving module receives an ONU identifier allocation message sent by the OLT; and if no, control the sending module to send the registration request to the OLT again in a next registration authorization timeslot allocated by the OLT, until the receiving module successfully receives the ONU identifier allocation message.

In a specific embodiment, the sending module 640 may include:

a drive current adjusting unit 641, configured to select one boundary value from a value range of drive currents supported by an upstream optical transmitter as an initial current value, and adjust a drive current of the upstream optical transmitter by using a preset variation so as to perform a progressive increase or decrease; and a sending unit 642, configured to send, within the registration authorization timeslot provided by the OLT for the ONU, an ONU registration request to the OLT according to an upstream sending wavelength corresponding to a drive current value to which the drive current of the upstream optical transmitter is currently adjusted.

In an embodiment, the wavelength configuration apparatus 600 may further include:

a wavelength calibrating module 660, configured to detect, according to the downstream receiving wavelength mapping table, whether a drift occurs on a downstream receiving wavelength of the downstream optical receiver of the ONU, and calibrate the downstream receiving wavelength when the drift occurs.

In an embodiment, the receiving module 610 may further be configured to receive an upstream sending wavelength adjustment instruction sent by the OLT. In addition, the sending module 640 is further configured to fine-tune the upstream sending wavelength of the upstream optical transmitter according to the upstream wavelength adjustment instruction, so that the OLT detects a receiving optical current of the OLT (or receive optical power of the OLT or an RSSI) and establishes an upstream receiving wavelength mapping table.

Further, the receiving module 610 is further configured to receive upstream receiving wavelength information delivered by the OLT after the upstream receiving wavelength mapping table is established. In addition, the wavelength mapping table establishing module 620 may further be configured to establish an upstream sending wavelength mapping table according to the upstream receiving wavelength information, where the upstream sending wavelength mapping table includes upstream sending wavelength information and drive current information of the upstream optical transmitter.

Further, the receiving module 610 may further be configured to: when the downstream wavelength information broadcast by the OLT is received, receive upstream wavelength information that is broadcast by the OLT separately through each downstream wavelength channel and is available for ONU registration. In addition, the wavelength configuration module 620 is further configured to query, according to the upstream wavelength information that is available for ONU registration, the drive current information of the upstream optical transmitter recorded in a related entry of the upstream sending wavelength mapping table, and set the upstream sending wavelength of the upstream optical transmitter according to the drive current information.

It should be understood that the foregoing description is merely an overview of main functions of each function module of the wavelength configuration apparatus 600. For a specific working process of the function modules, reference may be made to the wavelength configuration method in the foregoing embodiment. The division into the function modules is mainly based on specific functions in wavelength configuration. In a specific embodiment, when the wavelength switching apparatus 600 is applied to the ONU 120 in the multi-wavelength passive optical network system 100 shown in FIG. 2, the receiving module 610 may be implemented by using the downstream optical receiver 122 and a related driver module; the sending module 640 may be implemented by using the upstream optical transmitter 123 and a related driver module; the wavelength mapping table establishing module 620, the wavelength configuration module 630, the control module 650, and the wavelength calibrating module 660 may be implemented by using the MAC module of the ONU 120. Certainly, in another alternative embodiment, each function module of the wavelength configuration apparatus 600 may further be implemented by using another hardware entity.

Based on the foregoing descriptions of the embodiments, a person skilled in the art may clearly understand that the present invention may be implemented by software in addition to a necessary hardware platform or by hardware only. Based on such an understanding, all or the part of the technical solutions of the present invention contributing to the technology in the background part may be implemented in the form of a software product. The computer software product may be stored in a storage medium, such as a ROM/RAM, a magnetic disk, or an optical disc, and includes several instructions for instructing a computer apparatus (which may be a personal computer, a server, or a network apparatus) to perform the methods described in the embodiments or some parts of the embodiments of the present invention.

The foregoing descriptions are merely exemplary specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A wavelength configuration method for a multi-wavelength passive optical network (PON), the method comprising:

scanning, by an optical network unit (ONU), a downstream receiving wavelength, and receiving, during the process of scanning the downstream receiving wavelength, downstream wavelength information of each downstream wavelength channel that is broadcast by an optical line terminal (OLT) separately through each downstream wavelength channel of a multi-wavelength PON system;

establishing, by the ONU, a downstream receiving wavelength mapping table according to the downstream wavelength information, wherein an entry of the downstream receiving wavelength mapping table comprises downstream receiving wavelength information, drive current information of a downstream optical receiver, and a receiving optical physical parameter of the ONU;
wherein establishing, by the ONU, a downstream receiving wavelength mapping table, comprises:
detecting, by the ONU, a receiving optical current of the ONU, or receiving optical power of the ONU, or a received signal strength indication RSSI during the process of scanning the downstream receiving wavelength, and searching for a peak value of the receiving optical current of the ONU, or a peak value of the receiving optical power of the ONU, or an RSSI peak value; and
when the peak value of the receiving optical current of the ONU, or the peak value of the receiving optical power of the ONU, or the RSSI peak value is searched out, recording, by the ONU, a current drive current of the downstream optical receiver and downstream wavelength information of a downstream wavelength channel corresponding to the peak value of the receiving optical current of the ONU, or the peak value of the receiving optical power of the ONU, or the RSSI peak value, and establishing a downstream receiving wavelength mapping entry according to the foregoing three parameters; and
selecting, by the ONU, one downstream wavelength from the downstream wavelength information broadcast by the OLT, and setting, according to the drive current information of the downstream optical receiver recorded in a related entry of the downstream receiving wavelength mapping table, an operating wavelength of the downstream optical receiver to the selected downstream wavelength.

2. The wavelength configuration method according to claim 1, further comprising:
scanning, by the ONU, an upstream sending wavelength, and sending a registration request to the OLT in a registration authorization timeslot allocated by the OLT; and
determining whether an ONU identifier allocation message sent by the OLT is received, and if the ONU identifier allocation message sent by the OLT is not received, sending, in a next registration authorization timeslot allocated by the OLT, the registration request to the OLT again until the ONU identifier allocation message is successfully received.

3. The wavelength configuration method according to claim 2, wherein the scanning, by the ONU, an upstream sending wavelength, and sending a registration request to the OLT in a registration authorization timeslot allocated by the OLT comprises:
selecting, by the ONU, one boundary value from a value range of drive currents supported by an upstream optical transmitter of the ONU as an initial current value, and adjusting a drive current of the upstream optical transmitter by using a preset variation so as to perform a progressive increase or decrease; and
sending, by the ONU and within the registration authorization timeslot provided by the OLT for the ONU, the ONU registration request to the OLT according to an upstream sending wavelength corresponding to a drive current value to which the drive current of the upstream optical transmitter is currently adjusted.

4. The wavelength configuration method according to claim 3, further comprising: detecting, by the ONU according to the downstream receiving wavelength mapping table, whether a drift occurs on a downstream receiving wavelength of the downstream optical receiver of the ONU, and calibrating the downstream receiving wavelength when the drift occurs.

5. The wavelength configuration method according to claim 1, further comprising:
receiving, by the ONU, an upstream sending wavelength adjustment instruction sent by the OLT, and fine-tuning an upstream sending wavelength of an upstream optical transmitter according to the upstream sending wavelength adjustment instruction, so that the OLT detects a receiving optical physical parameter of the OLT and establishes an upstream receiving wavelength mapping table, wherein an entry of the upstream receiving wavelength mapping table comprises upstream receiving wavelength information, ONU sequence number information, and the receiving optical physical parameter of the OLT.

6. The wavelength configuration method according to claim 5, further comprising:
receiving, by the ONU, upstream receiving wavelength information delivered by the OLT after the upstream receiving wavelength mapping table is established, and establishing an upstream sending wavelength mapping table according to the upstream receiving wavelength information, wherein the upstream sending wavelength mapping table comprises upstream sending wavelength information and drive current information of the upstream optical transmitter.

7. The wavelength configuration method according to claim 6, wherein when receiving the downstream wavelength information broadcast by the OLT, the ONU further receives upstream wavelength information that is broadcast by the OLT separately through each downstream wavelength channel and is available for ONU registration.

8. The wavelength configuration method according to claim 7, further comprising:
querying, by the ONU according to the upstream wavelength information that is available for ONU registration, the drive current information of the upstream optical transmitter recorded in a related entry of the upstream sending wavelength mapping table, and setting the upstream sending wavelength of the upstream optical transmitter according to the drive current information.

9. The wavelength configuration method according to claim 5, further comprising: monitoring, by the OLT according to the upstream receiving wavelength mapping table, whether a drift occurs on an upstream sending wavelength of the ONU, and instructing the ONU to calibrate the upstream sending wavelength when the drift occurs.

10. A wavelength configuration apparatus for a multi-wavelength passive optical network (PON), the apparatus comprising:
a processor and a computer readable medium containing instructions for execution by the processor so as to configure the processor to,
scan a downstream receiving wavelength, and receive, during the process of scanning the downstream receiving wavelength, downstream wavelength information of each downstream wavelength channel that is broadcast by an optical line terminal (OLT) separately through each downstream wavelength channel of a multi-wavelength PON system;
establish a downstream receiving wavelength mapping table according to the downstream wavelength information, wherein an entry of the downstream receiving wavelength mapping table comprises downstream receiving wavelength information, drive current information of a downstream optical receiver, and a receiving optical physical parameter of an ONU;

wherein, establishing a downstream receiving wavelength mapping table, comprises:

searching for a peak value of a receiving optical current of the ONU, or a peak value of receiving optical power of the ONU, or an RSSI peak value from the detected receiving optical current of the ONU, or receiving optical power of the ONU, or received signal strength indication during the process of scanning the downstream receiving wavelength; and detecting the peak value of the receiving optical current of the ONU, or the peak value of the receiving optical power of the ONU, or the RSSI peak value, record a current drive current of the downstream optical receiver and downstream wavelength information of a downstream wavelength channel corresponding to the peak value of the receiving optical current of the ONU, or the peak value of the receiving optical power of the ONU, or the RSSI peak value, and establish a downstream receiving wavelength mapping entry according to the foregoing three parameters; and select one downstream wavelength from the downstream wavelength information broadcast by the OLT, and set, according to the drive current information of the downstream optical receiver recorded in a related entry of the downstream receiving wavelength mapping table, an operating wavelength of the downstream optical receiver to the selected downstream wavelength.

11. The wavelength configuration apparatus according to claim 10, wherein the processor is further configured to, scan an upstream sending wavelength, and send a registration request to the OLT in a registration authorization timeslot allocated by the OLT; and determine receipt of an ONU identifier allocation message sent by the OLT; and if the ONU identifier allocation message sent by the OLT is not received, send the registration request to the OLT again in a next registration authorization timeslot allocated by the OLT, until the ONU identifier allocation message is successfully received.

12. The wavelength configuration apparatus according to claim 11, wherein the processor is still further configured to, select one boundary value from a value range of drive currents supported by an upstream optical transmitter as an initial current value, and adjust a drive current of the upstream optical transmitter by using a preset variation so as to perform a progressive increase or decrease; and send, within the registration authorization timeslot provided by the OLT for the ONU, an ONU registration request to the OLT according to an upstream sending wavelength corresponding to a drive current value to which the drive current of the upstream optical transmitter is currently adjusted.

13. The wavelength configuration apparatus according to claim 12, wherein the processor is yet further configured to, detect, according to the downstream receiving wavelength mapping table, whether a drift occurs on a downstream receiving wavelength of the downstream optical receiver of the ONU, and calibrate the downstream receiving wavelength when the drift occurs.

14. The wavelength configuration apparatus according to claim 12, wherein the processor is yet further configured to, receive an upstream sending wavelength adjustment instruction sent by the OLT; and fine-tune the upstream sending wavelength of the upstream optical transmitter according to an upstream wavelength adjustment instruction, so that the OLT detects a receiving optical current of the OLT and establishes an upstream receiving wavelength mapping table.

15. The wavelength configuration apparatus according to claim 14, wherein the processor is yet further configured to, receive upstream receiving wavelength information delivered by the OLT after an upstream receiving wavelength mapping table is established; and establish an upstream sending wavelength mapping table according to the upstream receiving wavelength information, wherein the upstream sending wavelength mapping table comprises upstream sending wavelength information and drive current information of the upstream optical transmitter.

16. The wavelength configuration apparatus according to claim 15, wherein the processor is yet further configured to, when the downstream wavelength information broadcast by the OLT is received, receive upstream wavelength information that is broadcast by the OLT separately through each downstream wavelength channel and is available for ONU registration.

17. The wavelength configuration apparatus according to claim 16, wherein the processor is yet further configured to, query, according to the upstream wavelength information that is available for ONU registration, the drive current information of the upstream optical transmitter recorded in a related entry of the upstream sending wavelength mapping table, and set the upstream sending wavelength of the upstream optical transmitter according to the drive current information.

18. A multi-wavelength passive optical network PON system, comprising at least one optical line terminal OLT and multiple optical network units ONUs, wherein the at least one OLT is connected to the multiple ONUs in a point-to-multipoint manner by using an optical distribution network, and the ONUs comprise the wavelength configuration apparatus for a multi-wavelength PON according to claim 10.

* * * * *